(12) United States Patent
Sawada

(10) Patent No.: US 6,738,165 B2
(45) Date of Patent: May 18, 2004

(54) IMAGE READING APPARATUS

(75) Inventor: Hideki Sawada, Kyoto (JP)

(73) Assignee: Rohm Co. Ltd., Kyoto (JP)

( * ) Notice: Subject to any disclaimer, the term of this patent is extended or adjusted under 35 U.S.C. 154(b) by 695 days.

(21) Appl. No.: 09/739,814

(22) Filed: Dec. 20, 2000

(65) Prior Publication Data
US 2001/0024299 A1 Sep. 27, 2001

(30) Foreign Application Priority Data

Dec. 22, 1999 (JP) .............................. 11-364185
Jan. 11, 2000 (JP) ..................... 2000-002407
Feb. 2, 2000 (JP) ..................... 2000-025308

(51) Int. Cl.$^7$ ................................. H04N 1/04
(52) U.S. Cl. ................ 358/475; 358/474; 358/488; 358/461
(58) Field of Search ................ 358/474, 484, 358/488, 406, 475, 480, 296, 461, 471

(56) References Cited

U.S. PATENT DOCUMENTS 3,553,359 A * 1/1971 Dixon et al. ................ 358/496
5,107,350 A * 4/1992 Omori ......................... 358/461
6,169,612 B1 * 1/2001 Deguchi ..................... 358/488
6,547,400 B1 * 4/2003 Yokoyama ................... 353/98

FOREIGN PATENT DOCUMENTS

JP    404001065 A * 1/1992 ................. 257/202
JP    11-215301    8/1999 .......... H04N/1/028

* cited by examiner

Primary Examiner—Edward Coles
Assistant Examiner—Heather D Gibbs
(74) Attorney, Agent, or Firm—Michael D. Bednarek; Shaw Pittman LLP

(57) ABSTRACT

An image reading apparatus includes a housing provided with a light passage, a transparent plate mounted on the housing, a light source for emitting light into the light passage, a lens array facing the image reading section on the transparent plate, a plurality of light-receiving elements arranged in an array extending in a primary scanning direction, and a light reflector formed on the transparent plate. The light reflector is offset from the image reading section in the secondary scanning direction, which is perpendicular to the primary scanning direction.

20 Claims, 9 Drawing Sheets

IMAGE READING APPARATUS

BACKGROUND OF THE INVENTION

1. Field of the Invention

The present invention relates to an image reading apparatus, such as an image scanner, used for reading out images printed or drawn on an image-carrying medium.

2. Description of the Related Art

A conventional image reading apparatus is disclosed in JP-A-11(1999)-215301 for example. This apparatus, as shown in FIG. 8 of the accompanying drawings of the present application, includes a housing 91 upon which a transparent plate 90 is mounted. The housing 91 is made by molding awhile synthetic resin material. Inside the housing 91 is formed a light passage 92 defined by first and second wall surfaces 92a, 92b.

The conventional image reading apparatus also includes an insulating substrate upon which a plurality of light sources (light-emitting diodes) 93 are mounted. As shown in FIG. 8, light is emitted from the light sources 93 and may be reflected on the wall surfaces 92a, 92b. Thus, the light is led to the image reading section Se on the upper surface of the transparent plate 90. Below the image reading section Se, the housing 91 supports a lens array 94 for focusing the reflected light from the image reading section Se onto a plurality of light-receiving elements 95 mounted on the insulating substrate. In accordance with the amount of received light, each of the elements 95 outputs image reading signals.

As stated above, the housing 91 of the conventional apparatus is produced by molding resin. Specifically, referring to FIG. 9 of the accompanying drawings, use is made of two molding pieces, namely, an upper molding piece 96 and a lower molding piece 97. The upper molding piece 97 is provided with a downward (first) projection 96a, while the lower molding piece 97 is provided with an upward (second) projection 97a. As seen from the figure, the first and the second projections 96a, 97a cooperate to form the light passage 92 of the housing 91.

In this manner, however, it is impossible to cause the upper portion 92a of the first wall surface 92a to protrude to the right (see arrow N1) beyond the lower portion 92b' of the second wall surface 92b. Thus, in the conventional apparatus, the uppermost width L1 of the light passage 92 is made unduly large. Consequently, as shown in FIG. 8 (see arrows n), part of the light emitted from the light sources 93 will go out of the light passage 92 without illuminating the image reading section Se.

This disadvantage can be overcome by using a light reflector 98, as shown in FIG. 10 of the accompanying drawings, which is prepared separately from the housing 91 (the light reflector 98 is also disclosed in above-mentioned JP-A-11-215301). The reflector 98 is provided with a light shielding portion 98a protruding to the right beyond the lower portion 92b' of the second wall surface. Because of this structure, the light passage 92 has an uppermost width L2 smaller than the width L1 of FIG. 8.

While having such an advantage, the second conventional apparatus of FIG. 10 has the following shortcomings. First, the preparation of the reflector 98, which needs to be produced separately from the housing 91, may impair the production efficiency and increase the production cost. Second, additional positioning means is required for holding the reflector 98 in place within the housing 91.

Further, the conventional apparatus of FIG. 10 (and the apparatus of FIG. 8 as well) is disadvantageous in the following respects. Specifically, in the apparatus of FIG. 10, the plurality of light sources 93 are spaced from each other in the longitudinal direction of the housing 91. Part of the light emitted from each light source 93 indirectly reaches the image reading section Se after being reflected (scattered, to be precise) by the wall surfaces defining the light passage 92, whereas the other part of the light directly reaches the section Se, traveling straight from the light source 93 to the section Se, as shown by the arrow n1 in FIG. 10. The indirect light from the light source 93 can uniformly illuminate the image reading section Se, since the indirect light, scattered by the wall surfaces, will be distributed uniformly over the length of the section Se. On the other hand, the direct light from the light sources 93 is not subjected to such scattering. Thus, as shown in FIG. 11, the direct light is liable to produce a non-uniform illuminating condition in which relatively bright portions BP and relatively dark portions DP are disposed alternately along the section Se. Clearly, such non-uniformity in brightness makes it difficult or even impossible to achieve accurate image reading operation.

Still further, in the conventional apparatus of FIG. 10 (and the one of FIG. 8), the lens array 94 is simply fitted into a lens holding groove formed in the housing 91. Thus, the lens array 94 may be displaced in the groove or even come out of the groove. Also, the lens array 94 may be thermally warped in the vertical direction.

SUMMARY OF THE INVENTION

The present invention has been proposed under the circumstances described above, and its object is to overcome the problems encountered in the conventional image reading apparatus.

According to the present invention, there is provided an image reading apparatus includes a housing provided with a light passage, a transparent plate mounted on the housing, a light source for emitting light into the light passage, a lens array facing an image reading section on the transparent plate, a plurality of light-receiving elements arranged in an array extending in a primary scanning direction, and a light reflector formed on the transparent plate. The reflector is offset from the image reading section in a secondary scanning direction perpendicular to the primary scanning direction.

The light reflector may be a white material applied on the transparent plate or a white strip member fixed to the transparent plate.

According to a preferred embodiment of the present invention, the light reflector may cover the entire surface of the transparent plate except a predetermined region facing the lens array.

Preferably, the apparatus of the present invention may further include a light blocker for preventing light from traveling directly from the light source to the image reading section.

Preferably, the housing may be provided with a plurality of inner wall surfaces defining the light passage, wherein the light blocker may be located on a particular one of the inner wall surfaces.

In a preferred embodiment of the present invention, the light source may be offset from the image reading section in the secondary scanning direction. In this case, the particular one of the inner wall surfaces may be located between the light source and the image reading section, as viewed in the secondary scanning direction.

Preferably, the light blocker may reflect light instead of absorbing light.

Preferably, the light blocker may be formed integral with the housing.

Preferably, the housing may be formed with a lens array fixing slit and an adhesive supplying bore communicating with the slit. Adhesive supplied in the adhesive supplying bore serves to hold the lens array in place.

Preferably, the apparatus of the present invention may further include a light absorber arranged to enclose the light-receiving elements. The light absorber may be provided with a contact portion held in engagement with the lens array, wherein the contact portion corresponds in position to the adhesive supplying bore.

Preferably, the adhesive supplying bore may be unopened toward the image reading section. With such an arrangement, a light-reflecting surface can be provided near the image reading section, whereby light is effectively directed toward the image reading section.

According to a preferred embodiment of the present invention, the adhesive supplying bore may be open in a direction going from the image reading section to the light-receiving elements.

Preferably, the housing may be formed with a lens array engaging member coming into engagement with a light-incident end of the lens array. In this manner, the lens array is reliably held in place or prevented from being thermally warped. In this case, the light absorber maybe provided with a contact portion held in engagement with the lens array, wherein the contact portion corresponds in position to the lens array engaging member.

Preferably, the light absorber may be dark-colored, in particular, black.

Preferably, the lens array may include an elongated holder and a plurality of lenses held together by the holder, wherein the contact portion of the light absorber may be held in engagement with the holder.

Preferably, the contact portion of the light absorber may be provided with a first contact surface and a second contact surface perpendicular to the first contact surface, wherein the lens array is supported by the first and the second contact surfaces.

Preferably, the contact portion of the light absorber may serve to prevent noise-causing light from reaching the light-receiving elements.

Other features and advantages of the present invention will become apparent from the detailed description given below with reference to the accompanying drawings.

DETAILED DESCRIPTION OF THE PREFERRED EMBODIMENTS

The preferred embodiments of the present invention will be described below with reference to the accompanying drawings.

Reference is first made to FIGS. 1–4 showing a document scanner A embodying the present invention.

Figure 1:
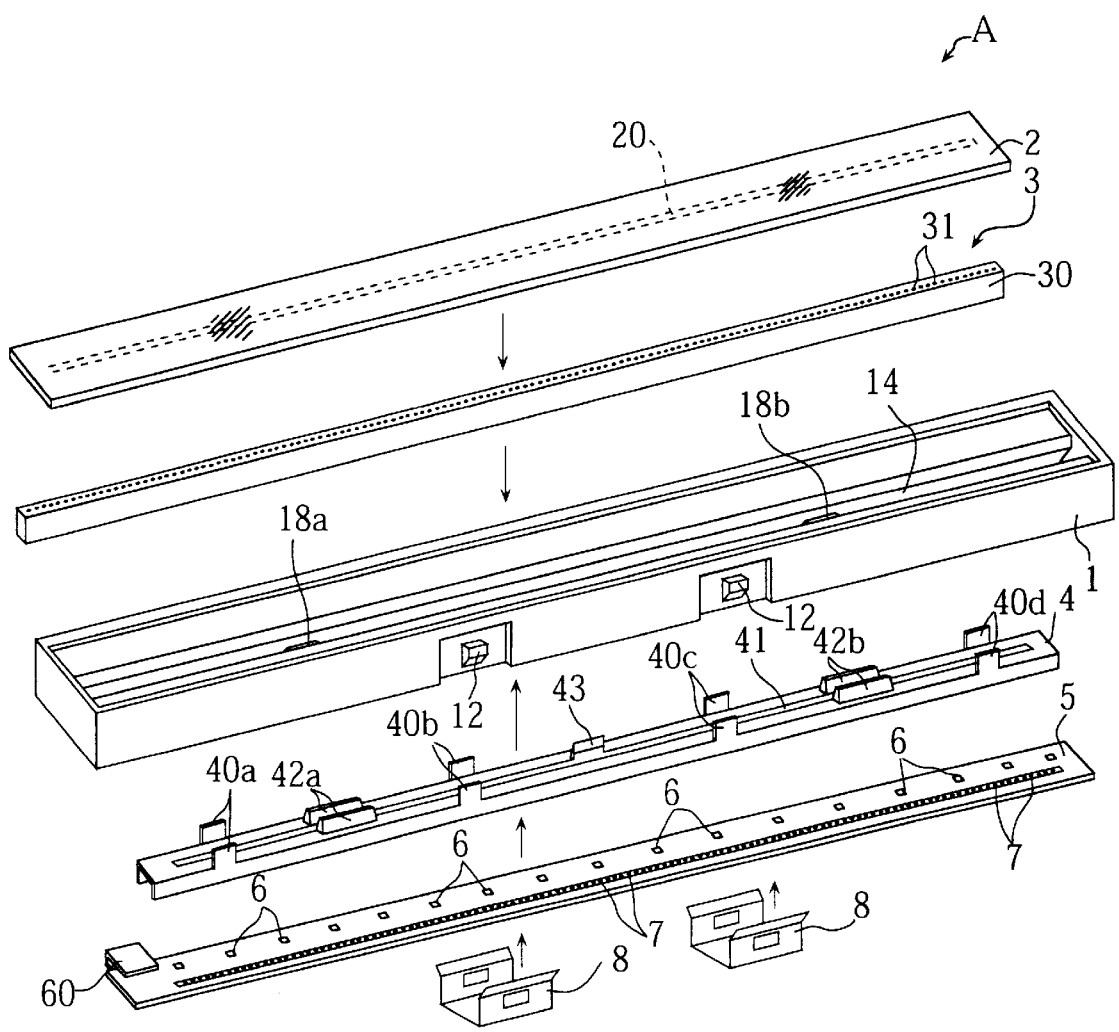
FIG. 1 is an exploded view showing principal components of an image reading apparatus embodying the present invention.

As shown in FIG. 1, the scanner A includes a housing 1, a transparent plate 2, a lens array 3, a light absorber 4, an insulating substrate 5, a plurality of light-emitting diodes (LEDs) 6, a plurality of light-receiving elements 7 and a pair of attachments 8.

The housing 1 is made of a white synthetic resin material, so that every surface of the housing 1 serves as an excellent light reflector. Such a material may be polycarbonate containing titanium oxide. The housing 1 has an elongated and generally rectangular configuration. As will be described in detail below, the housing 1 is formed with a light passage 14 and other necessary openings. The housing 1 is also formed with two pressers 18a and 18b spaced from each other longitudinally of the housing 1. The pressers 18a, 18b keep the lens array 3 in place within the housing 1.

The transparent plate 2 is rectangular and may be made of glass or synthetic resin. The plate 2 is fixed to the top of the housing 1. In use, a document is to be brought into sliding contact with the plate 2 so that the images printed on the document are read out. A long and white light-reflecting strip 20 is formed on the reverse surface of the plate 2. The reflecting strip 20 may be provided by applying white paint to the plate 2 or by attaching white tape (film) or metal layer to the plate 2. Alternatively, the strip 20 may be provided by whitening a part of the transparent plate 2 or by embedding a white reflecting member in the plate 2.

The lens array 3 is made up of an elongated holder 30 and a plurality of lenses 31 supported by the holder 30. The holder 30 may be made of synthetic resin. Each of the lenses 31 may preferably a self-focusing lens designed to focus an original image onto a light-receiving element in a non-inverting and size-maintaining manner. As seen from FIGS. 2–4, the lens array 3 is fitted into a lens-positioning slit 10 formed in the housing 1, so that the upper end (light-incident end) of the lens array 3 faces the reverse surface 2b of the transparent plate 2.

Figure 2:
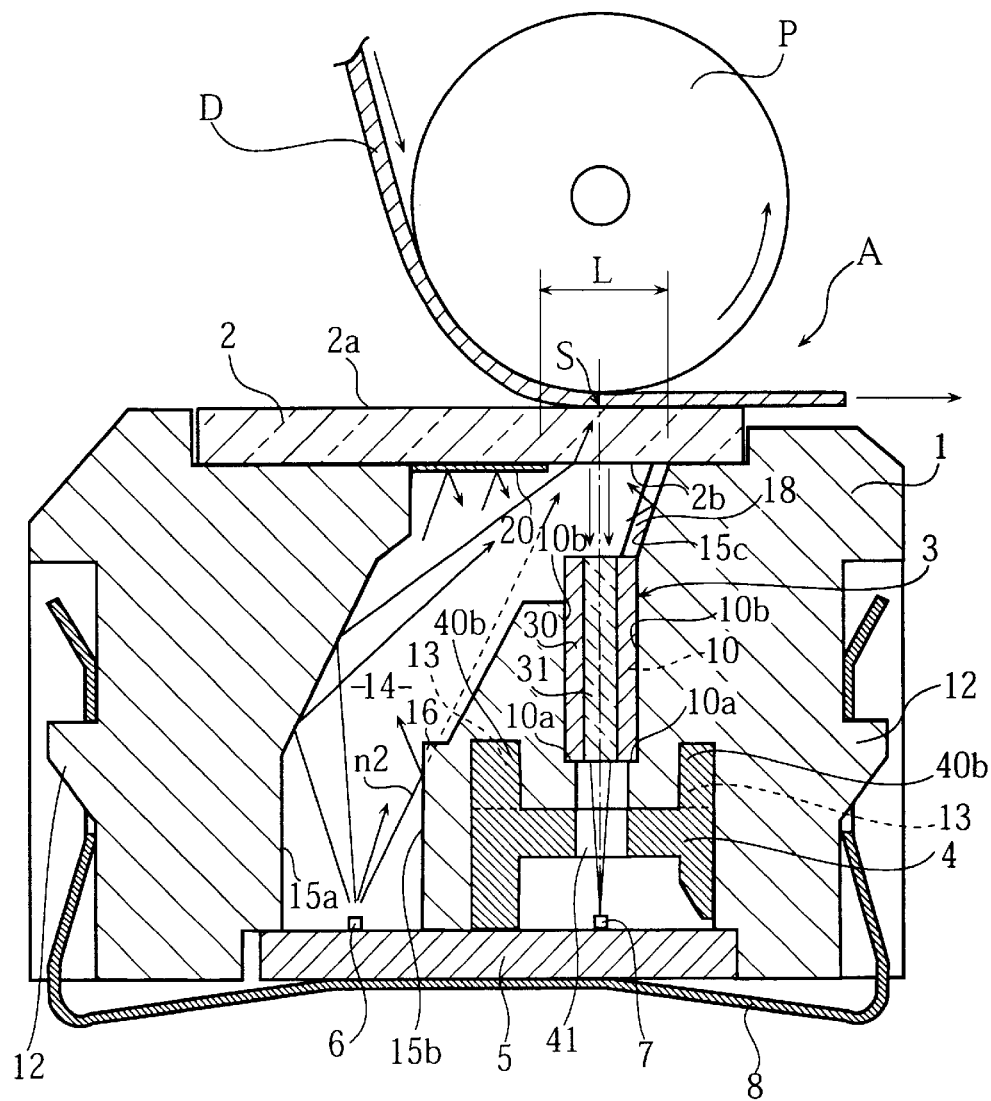
FIG. 2 is a sectional view of the apparatus of FIG. 1, taken at the position of a pair of positioning protrusions of a light absorber used for the apparatus.
Figure 3:
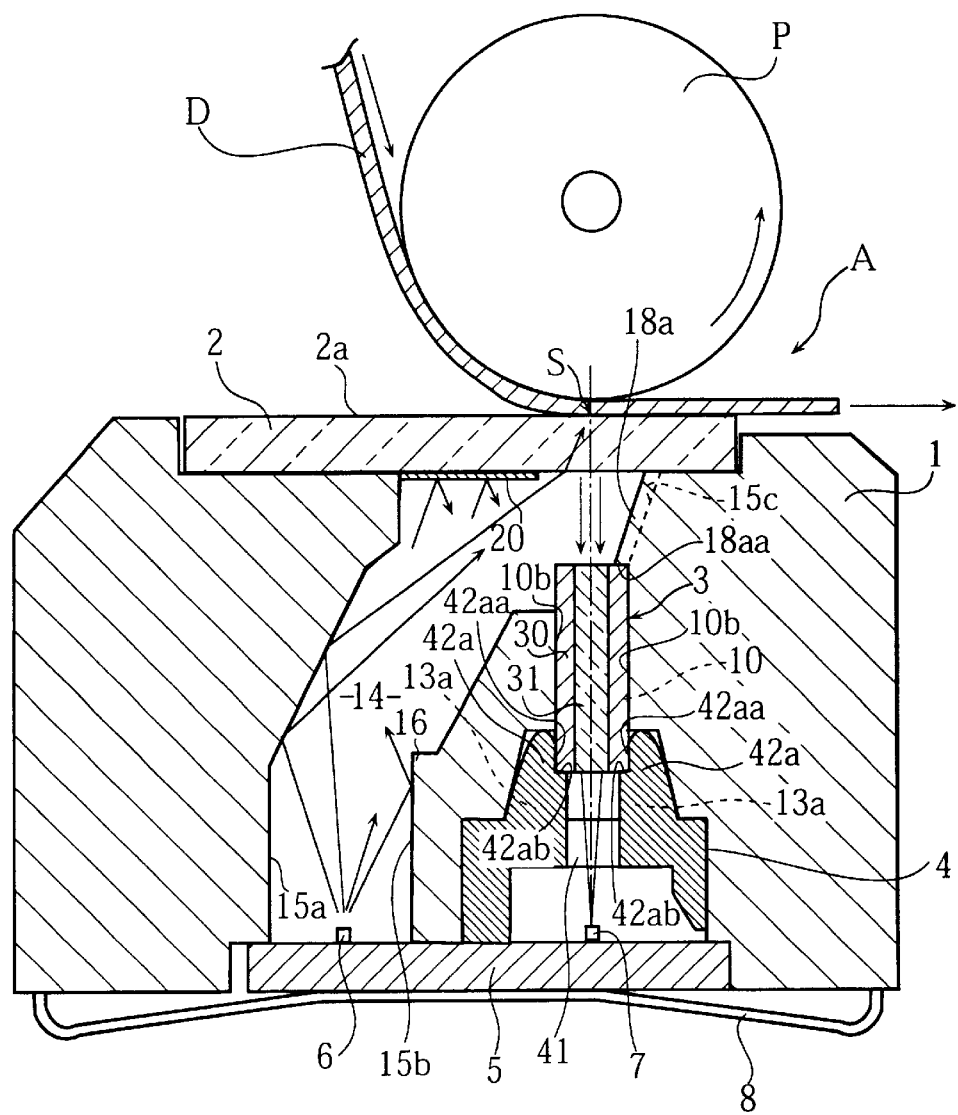
FIG. 3 is a sectional view of the apparatus of FIG. 1, taken at the position of a pair of intermediate light-shielding protrusions of the light absorber.
Figure 4:
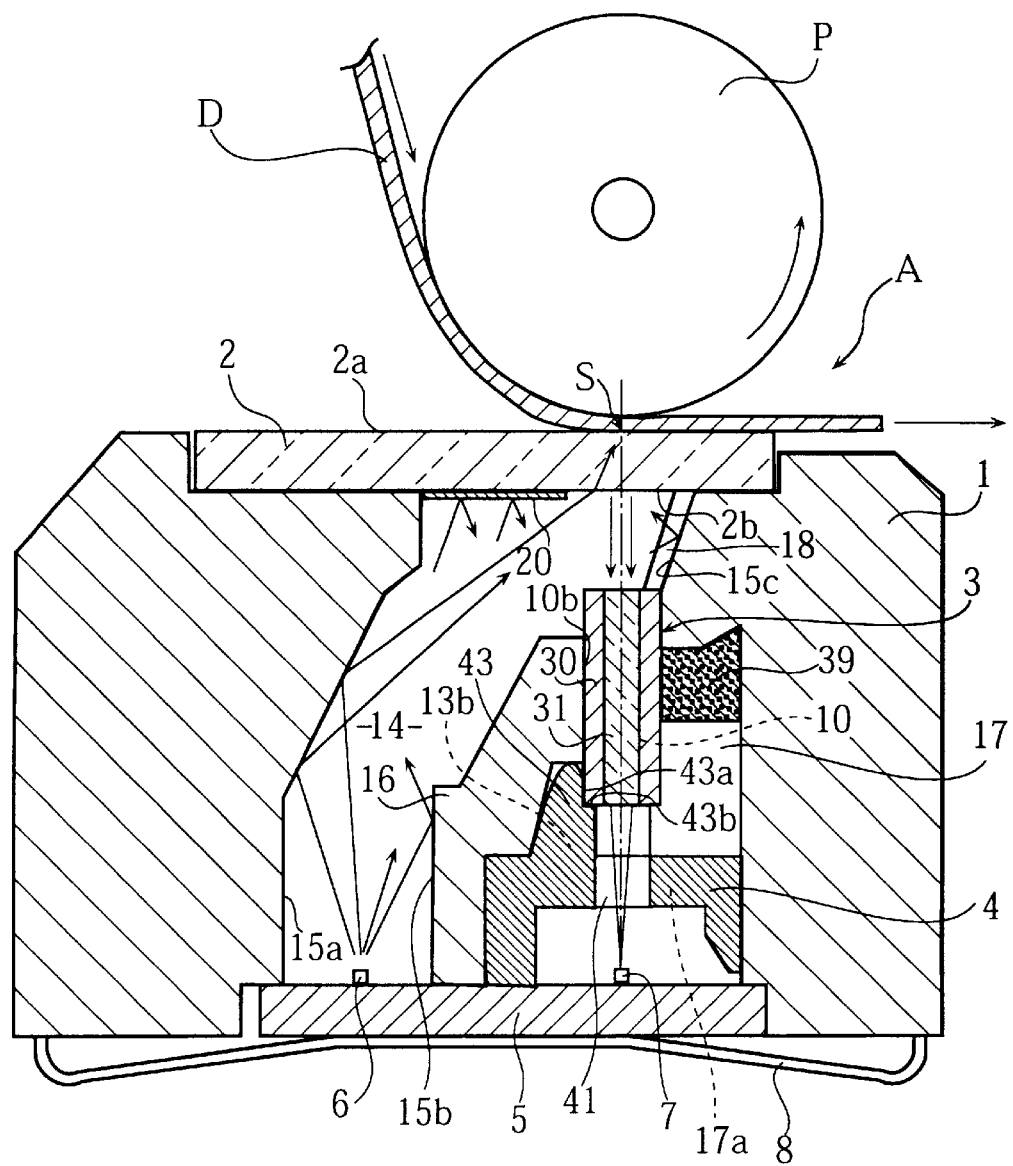
FIG. 4 is a sectional view of the apparatus of FIG. 1, taken at the position of a central light-shielding protrusions of the light absorber.

The light absorber 4 may be made of black ABS (acrylonitrile-butadiene-styrene) resin, so that light is absorbed by the surfaces of the light absorber 4 but not reflected thereon. As shown in FIGS. 2–4, the light absorber 4, fixed to the housing 1, encloses the light-receiving elements 7 for preventing the scattering of light around the elements 7. The absorber 4 is formed with a slit 41 for allowing the passage of light.

As shown in FIG. 1, the light absorber 4 is provided with four pairs of positioning protrusions 40a–40d, two pairs of intermediate light-shielding protrusions 42a and 42b, and a single central light-shielding protrusion 43. The first pair of light-shielding protrusions 42a is disposed between the first and the second pairs of positioning protrusions 40a, 40b. The second pair of light-shielding protrusions 42b is disposed between the third and the fourth pairs of positioning protrusions 40c, 40d. The central light-shielding protrusion 43 is disposed between the second and the third pairs of positioning protrusions 40b, 40c.

As shown in FIG. 2, the second pair of positioning protrusions 40b is fitted into a relevant pair of recesses 13 formed in the housing 1. Though not illustrated, the other pairs of positioning protrusions 40a, 40c and 40d are fitted into similar recesses formed in the housing 1. In this manner, the light absorber 4 is fixed in position relative to the housing 1 in the longitudinal direction of the housing 1.

As shown in FIG. 3, the first pair of light-shielding protrusions 42a is fitted into a relevant pair of recesses 13a communicating with the lens-positioning slit 10. As seen from FIGS. 1 and 3, the paired recesses 13a are provided below the first presser 18a. As shown in FIG. 3, each of the light-shielding protrusions 42a is formed with a first contact surface 42aa and a second contact surface 42ab. The first contact surface 42aa comes into contact with a lower portion of a side surface of the lens holder 30, while the second contact surface 42ab comes into contact with a bottom portion of the holder 30.

Though not illustrated, the second pair of light-shielding protrusions 42b is fitted into a pair of recesses similar to the recesses 13a shown in FIG. 3. Those non-illustrated recesses are provided below the second presser 18b (FIG. 1). The second pair of light-shielding protrusions 42b comes into contact with the lens holder 30 in the same manner as the first pair of light-shielding protrusions 42a shown in FIG. 3.

As shown in FIG. 4, the central light-shielding protrusion 43 is fitted into a central recess 13b communicating with the lens-positioning slit 10. The protrusion 43 is formed with an upright, first contact surface 43a and a horizontal, second contact surface 43b. As illustrated, the first contact surface 43a comes into contact with a lower portion of a side surface of the holder 30, while the second contact surface 43b comes into contact with a bottom portion of the holder 30.

On the opposite side of the central recess 13b with respect to the lens-positioning slit 10, the housing 1 is formed with an downwardly-open bore 17 communicating with the slit 10. As shown in FIG. 4, adhesive 39 is provided in the bore 17. The adhesive 39, in cooperation with the lens array pressers 18a and 18b (see also FIG. 1), serves to hold the lens array 3 in place.

Figure 5:
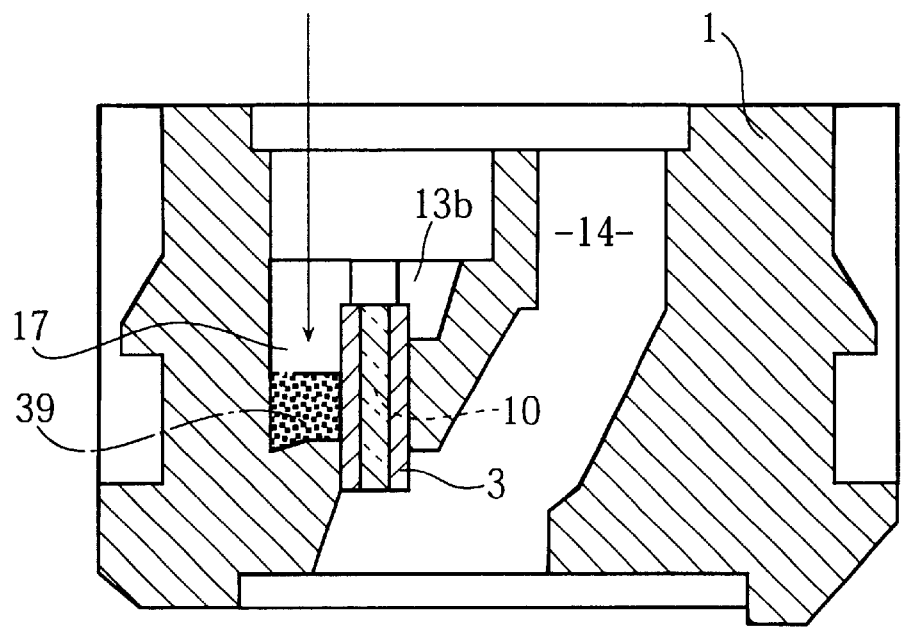
FIG. 5 illustrates how adhesive is supplied in a bore formed in the housing of the apparatus of FIG. 1.

The adhesive 39 may be applied in the manner shown in FIG. 5. Specifically, first the housing 1 is turned upside down, with the lens array 3 fitted into the slit 10. Then, the adhesive 39 is poured into the bore 17. The adhesive 39 may preferably be ultraviolet-curing resin, which can be cured in a relatively-short period of time.

The substrate 5, which carries the LEDs 6 and the light-receiving elements 7, is releasably fixed to the bottom of the housing 1 by the attachments 8. To this end, as shown in FIGS. 1 and 2, the housing 1 is provided, in its longitudinal side surfaces, with projections 12 which are brought into engagement with the holes of the attachments 8. For non-releasably securing the substrate 5 to the housing 1, use may be made of adhesive in place of the attachments 8.

The LEDs 6 as a light source and the light-receiving elements 7 are arranged in an array extending longitudinally of the substrate 5 or in the primary scanning direction, as shown in FIG. 1. When the substrate 5 is fixed to the housing 1, as shown in FIGS. 2–4, the LEDs 6 are positioned in the light passage 14, while the light-receiving elements 7 are positioned immediately under the lens array 3. Thus, the LEDs 6 are offset from the light-receiving elements 7 in the secondary scanning direction perpendicular to the primary scanning direction. Each of the elements 7 may include a photoelectric cell so that image detection signals are outputted in accordance with the amount of received light.

Thought not depicted in the accompanying figures, a wiring pattern is formed on the substrate 5, to be connected to the LEDs 6 and the light-receiving elements 7 for power supply and signal transmission. The wiring pattern is also connected to a connector 60 (see FIG. 1) fixed to the substrate 5. The connector 60 is provided for establishing connection between the scanner A and an external device.

As shown in FIGS. 2–4, the light passage 14 is defined by a plurality of inner surfaces of the housing 1, including a first wall surface 15a, a second wall surface 15b and a third wall surface 15c. These wall surfaces 15a–15c are rendered white so that they can reflect light with high reflectance.

As shown in FIG. 2 for example, each of the first and the second wall surfaces 15a, 15b includes an upright portion engaged with the obverse surface of the substrate 5, and a slant portion whose upper end is horizontally offset toward the lens array 3 (to the right in FIG. 2) from its lower end. The third wall surface 15c, disposed immediately above the lens array 3, is a slant plane whose upper end is horizontally offset to the right from its lower end.

According to the illustrated embodiment, the second wall surface 15b is provided with a white, light-shielding edge (light blocker) 16 for preventing light from traveling directly from the LEDs 6 to the image reading section S. The light-shielding edge 16 extends continuously in the longitudinal direction of the housing 1. According to the present invention, the light-shielding edge 16 may be replaced by two or more, relatively short light-shielding pieces arranged in an array extending longitudinally of the housing 1.

The function of the image scanner A having the above arrangements will now be described.

Upon being turned on, the LEDs 6 emit light. This light, as shown in FIGS. 2–4, is reflected on either one or both of the first and second wall surfaces 15a, 15b, thereby being directed toward the image reading section S for illuminating the document D held in sliding contact with the transparent plate 2. While being thus illuminated, the document D is forwarded by a platen roller P arranged in facing relation to the plate 2.

Figure 11:
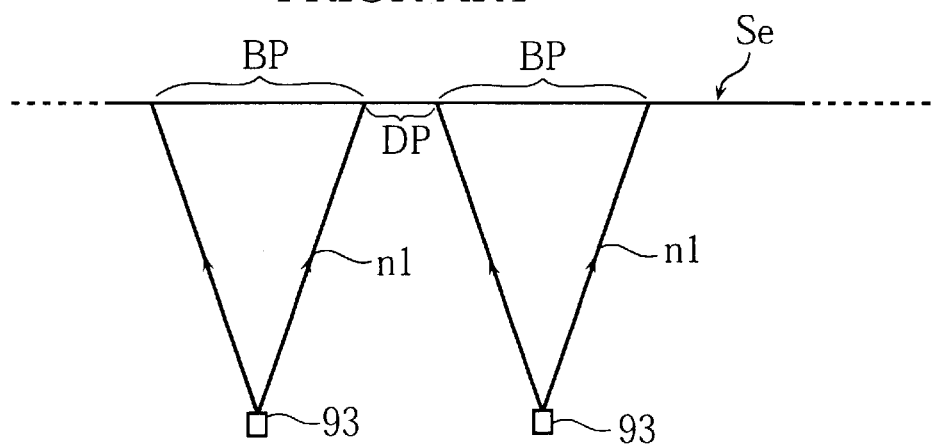
FIG. 11 illustrates a problem encountered in the conventional apparatus.

According to the present invention, as stated above, otherwise direct light emitted from the LEDs 6 is blocked (scattered, to be precise) by the light-shielding edge 16. Thus, the conventional problem of non-uniform illumination (see FIG. 11) is overcome. It should be noted here that the scattered light will eventually be led to the image reading section S after being reflected by the wall surfaces of the light passage 14. Thus, the image reading section S is illuminated with a sufficient amount of light in spite of the presence of the light-shielding edge 16.

Further, according to the present invention, the third wall surface 15c is disposed adjacent to the image reading section S, with its lower edge contacted with the light-incident surface of the lens array 3. Such an arrangement is advantageous to directing the light striking on the third wall surface 15c toward the image reading section S.

Still further, according to the present invention, the light-reflecting strip 20 is formed on the reverse surface 2b of the transparent plate 2. Thus, it is possible to prevent light from going out of the light passage 14 without illuminating the image reading section S. The light reflected on the strip 20 will be reflected on the wall surfaces 15a–15c and led to the image reading section S.

After illuminating the reading section S, the light passes through the lenses 31 of the lens array 3, thereby being focused onto the light-receiving elements 7.

In traveling from the image reading section S to the light-receiving elements 7, part of the light may enter the clearance formed between the lens array 3 and the wall surface 10b defining the lens-positioning slit 10. Without taking any countermeasures, such stray light would leak out from the clearance and behave as noise for the light-receiving elements 7, which is disadvantageous to performing proper light detection.

According to the present invention, however, the above-mentioned light leakage is prevented in the following manners. First, referring to FIG. 2, a horizontal step portion 10a is formed, when possible, at the lower end of the lens-positioning slit 10. With the step portion 10a, the stray light is reliably blocked.

When it is not possible to form such a light-shielding step portion, the light-shielding protrusions 42a–42b (see FIG. 1) of the light absorber 4 serve to block the stray light. As shown in FIG. 3, the light-shielding protrusions 42a (and the protrusions 42b as well) are formed with a horizontal contact surface 42ab, which serves to block the stray light.

According to the present invention, light-shielding protrusions may not necessarily be used in pairs. As shown in FIG. 4, the single light-shielding protrusion 43 may suffice where supplemental means is provided in corporation with the light-shielding protrusion 43. In the illustrated embodiment, the supplemental means is the adhesive 39 provided on the opposite side of the protrusion 43 with respect to the lens array 3. With the use of such adhesive, the stray light is prevented from leaking out of the clearance between the wall surface 10b and the lens array 3.

Figure 6:
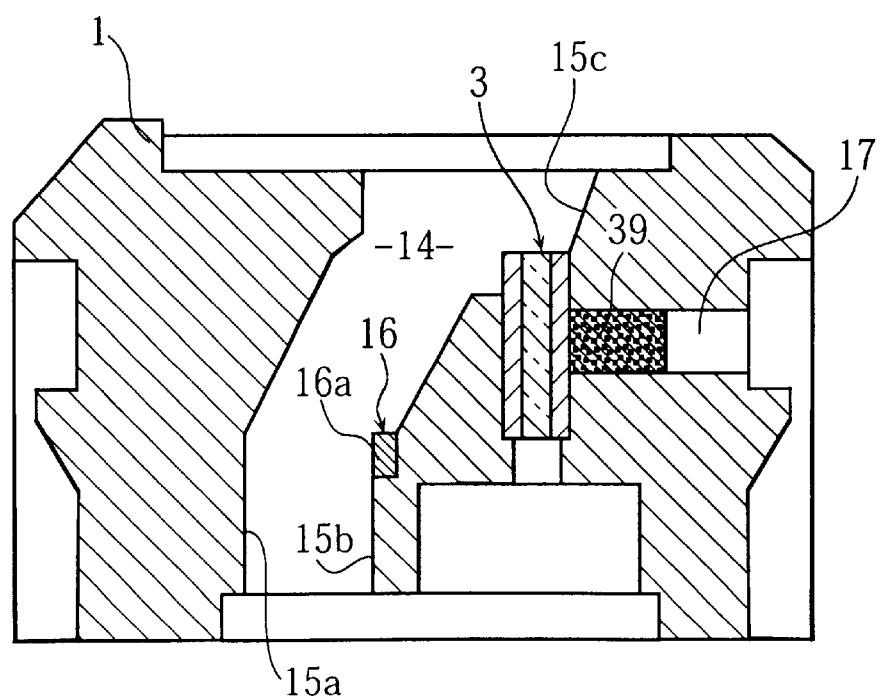
FIG. 6 is a sectional view showing a different housing arrangement, whereby an adhesive-accommodating bore is rendered to extend horizontally, and a separately-prepared, direct light blocker is used.

According to the present invention, the adhesive-accommodating bore 17 may not necessarily be rendered downwardly-open. For instance, as shown in FIG. 6, the bore 17 may be open horizontally.

Further, the light-shielding edge 16 may not necessarily be formed integral with the housing 1. For instance, as shown in FIG. 6, a separately-prepared light-shielding member 16a may be used. Also, the cross section of the light-shielding member may not be rectangular, as long as the light-shielding member 16a can properly shield the direct light emitted from the light sources 6.

Figure 7:
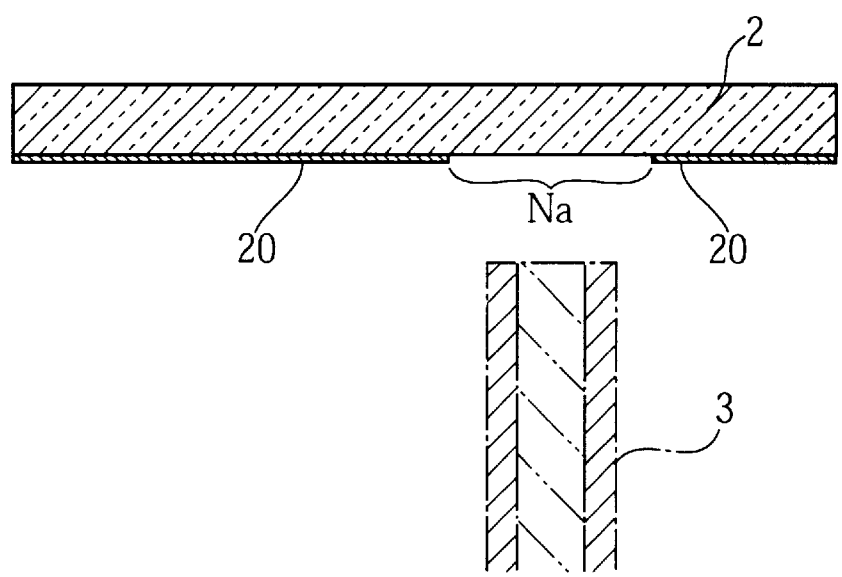
FIG. 7 is a sectional view showing the transparent, paper-supporting plate whose reverse surface is entirely covered by a light-reflecting layer except for a predetermined region.
Figure 8:
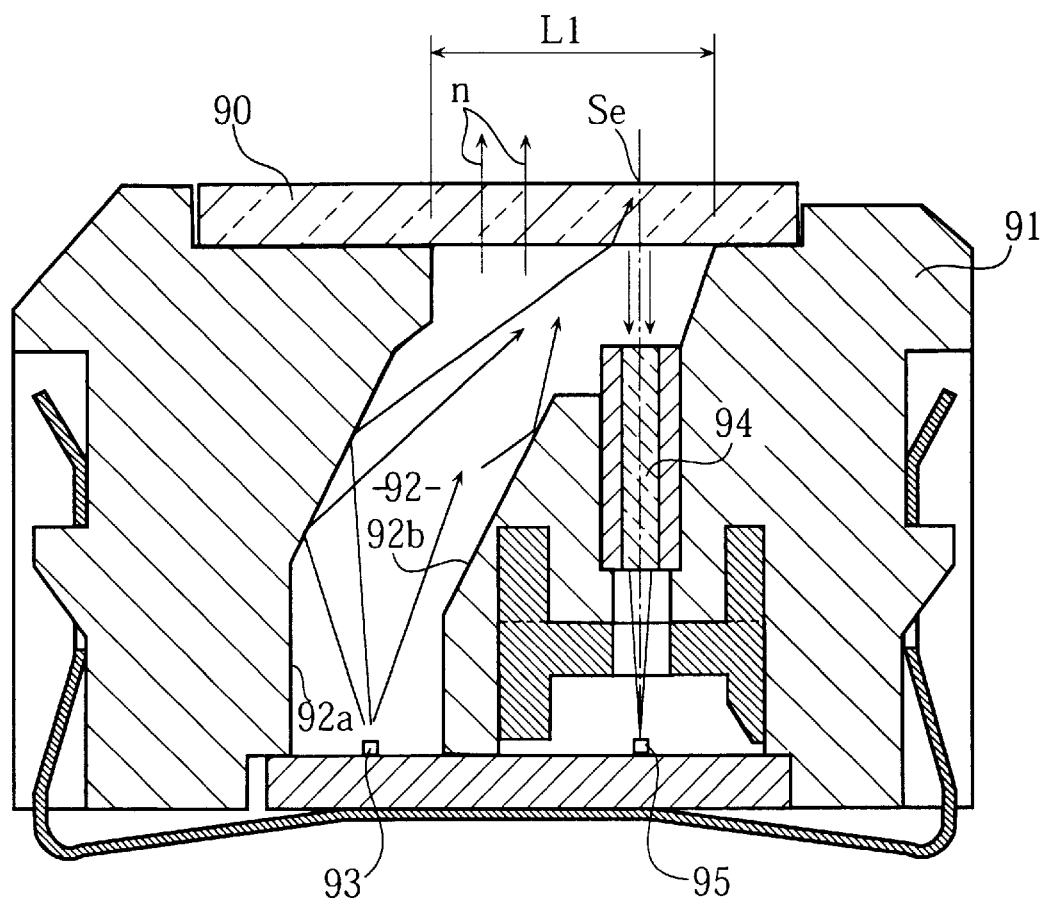
FIG. 8 is a sectional view showing a conventional image reading apparatus.
Figure 9:
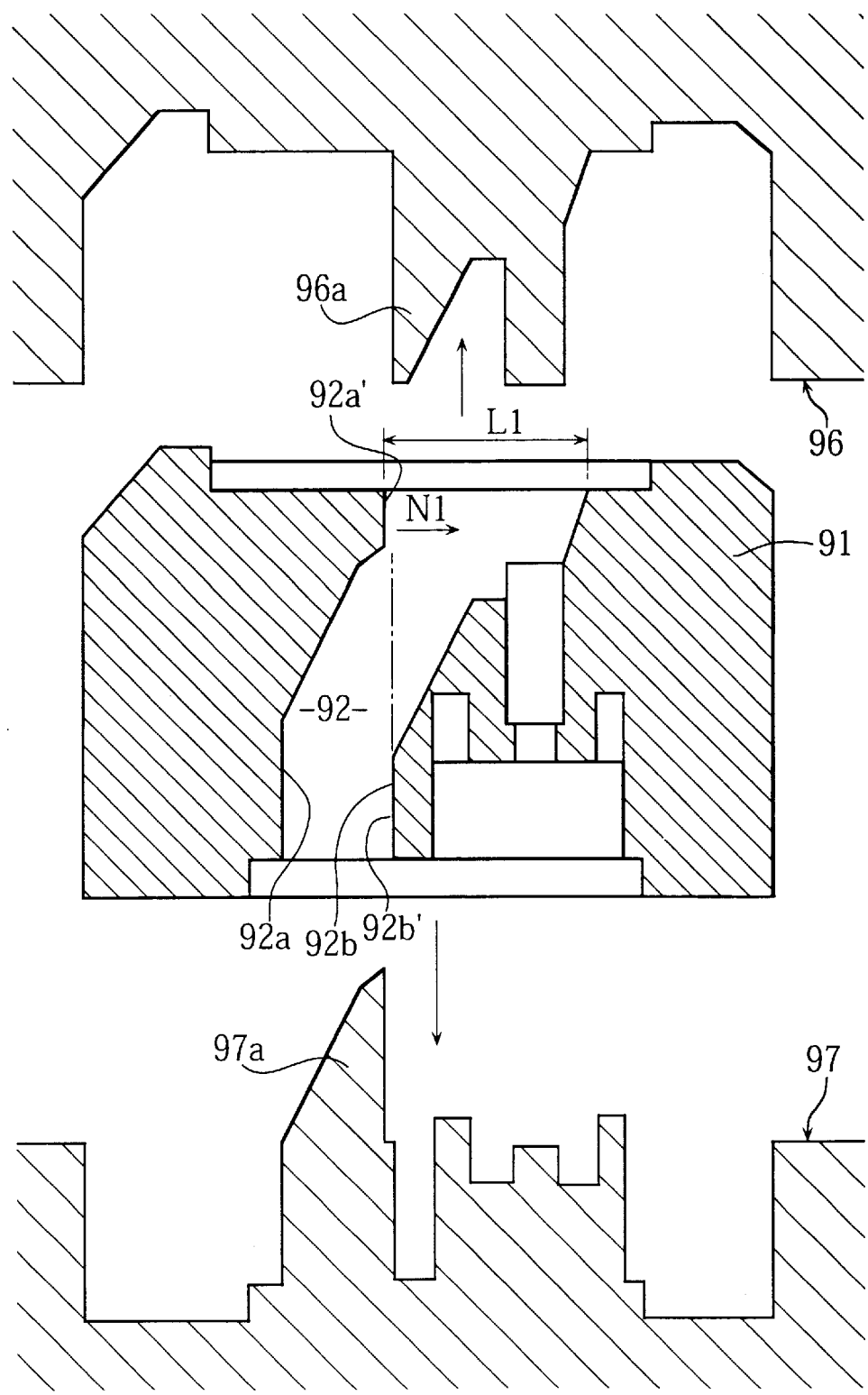
FIG. 9 is a sectional view showing how the housing of the conventional apparatus is molded.
Figure 10:
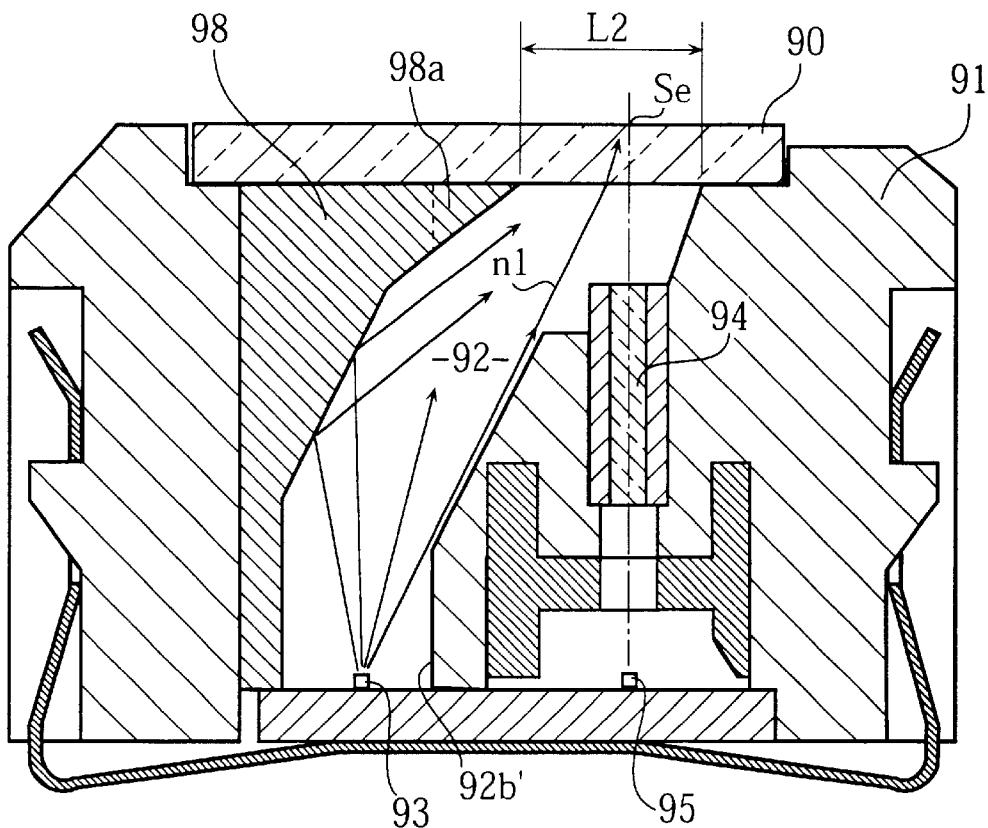
FIG. 10 is a sectional view showing another conventional image reading apparatus.

Still further, the light-reflecting strip 20 may be formed over the entire surface of the transparent plate 2 except a predetermined region Na located immediately above the light array 3, as shown in FIG. 7. The light-reflecting strip 20 may be formed on the obverse surface of the plate 2 instead of the reverse surface.

In the illustrated embodiment, the light source is composed of a plurality of LEDs 6. However, those LEDs 6 may be replaced by a single cold-cathode tube.

Also, a transparent light-conducting member such as a prism may be disposed in the light passage 14.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. An image reading apparatus comprising:
    a housing provided with a light passage;
    a transparent plate mounted on the housing;
    a light source for emitting light into the light passage;
    a lens array facing an image reading section on the transparent plate;
    a plurality of light-receiving elements arranged in an array extending in a primary scanning direction; and
    a light reflector formed on the transparent plate, the reflector being offset from the image reading section in a secondary scanning direction perpendicular to the primary scanning direction.

2. The apparatus according to claim 1, wherein the light reflector comprises a white material applied on the transparent plate.

3. The apparatus according to claim 1, wherein the light reflector comprises a white strip member fixed to the transparent plate.

4. The apparatus according to claim 1, wherein the light reflector covers an entire surface of the transparent plate except a predetermined region facing the lens array.

5. The apparatus according to claim 1, further comprising a light blocker for preventing light from traveling directly from the light source to the image reading section.

6. The apparatus according to claim 5, wherein the housing is provided with a plurality of inner wall surfaces defining the light passage, the light blocker being located on one of the inner wall surfaces.

7. The apparatus according to claim 6, wherein the light source is offset from the image reading section in the secondary scanning direction, said one of the inner wall surfaces being located between the light source and the image reading section in the secondary scanning direction.

8. The apparatus according to claim 5, wherein the light blocker reflects light.

9. The apparatus according to claim 5, wherein the light blocker is formed integral with the housing.

10. The apparatus according to claim 1, wherein the housing is formed with a lens array fixing slit and an adhesive supplying bore communicating with the slit.

11. The apparatus according to claim 10, further comprising a light absorber enclosing the light-receiving elements, the light absorber being provided with a contact portion held in engagement with the lens array, the contact portion corresponding in position to the adhesive supplying bore.

12. The apparatus according to claim 10, further comprising adhesive provided in the adhesive supplying bore for fixing the lens array in position.

13. The apparatus according to claim 10, wherein the adhesive supplying bore is unopened toward the image reading section.

14. The apparatus according to claim 13, wherein the adhesive supplying bore is open in a direction going from the image reading section to the light-receiving elements.

15. The apparatus according to claim 1, wherein the housing is formed with a lens array engaging member coming into engagement with a light-incident end of the lens array.

16. The apparatus according to claim 15, further comprising a light absorber enclosing the light-receiving elements, the light absorber being provided with a contact portion held in engagement with the lens array, the contact portion corresponding in position to the lens array engaging member.

17. The apparatus according to claim 16, wherein the light absorber is dark-colored.

18. The apparatus according to claim 16, wherein the lens array comprises an elongated holder and a plurality of lenses held together by the holder, the contact portion of the light absorber being held in engagement with the holder.

19. The apparatus according to claim 18, wherein the contact portion of the light absorber is provided with a first contact surface and a second contact surface perpendicular to the first contact surface, the lens array being supported by the first and the second contact surfaces.

20. The apparatus according to claim 19, wherein the contact portion of the light absorber prevents noise-causing light from reaching the light-receiving elements.

* * * * *